July 17, 1951   J. L. CALIRI   2,560,552
SOLDERING GUN
Filed June 29, 1949   2 Sheets-Sheet 1
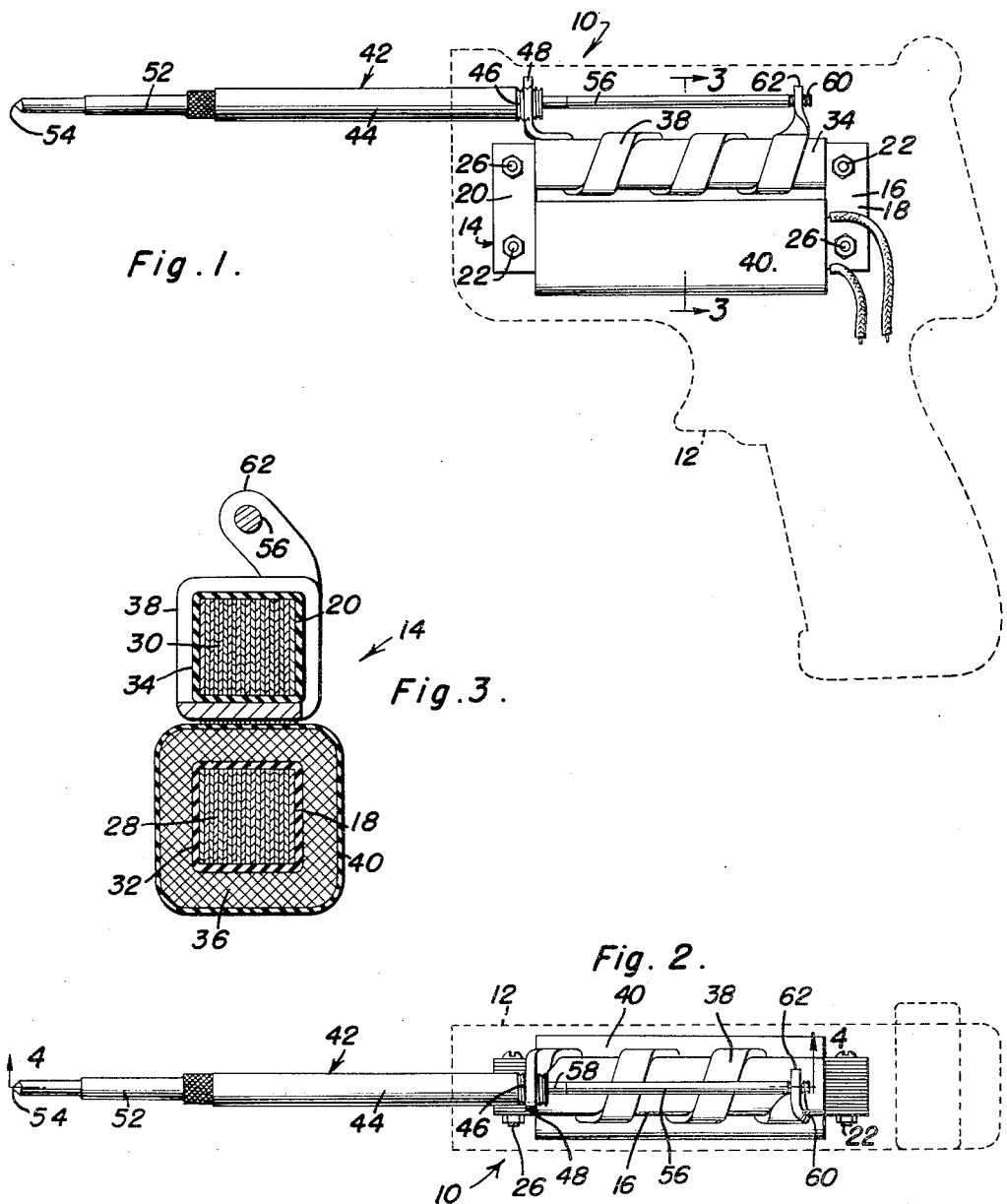
Joseph L. Caliri
INVENTOR.

July 17, 1951
J. L. CALIRI
2,560,552
SOLDERING GUN
Filed June 29, 1949
2 Sheets-Sheet 2
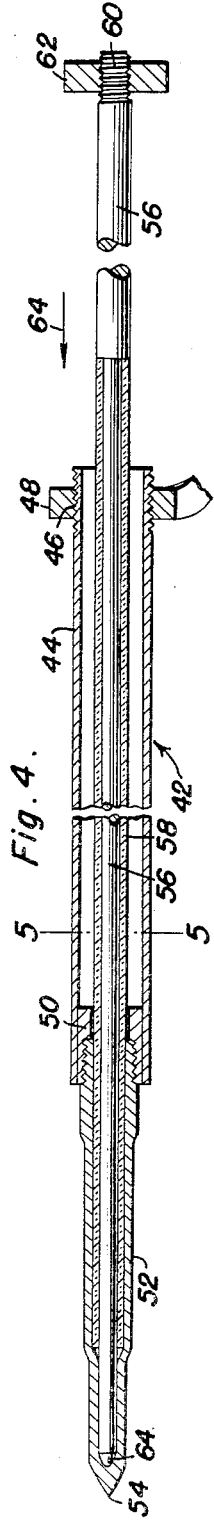
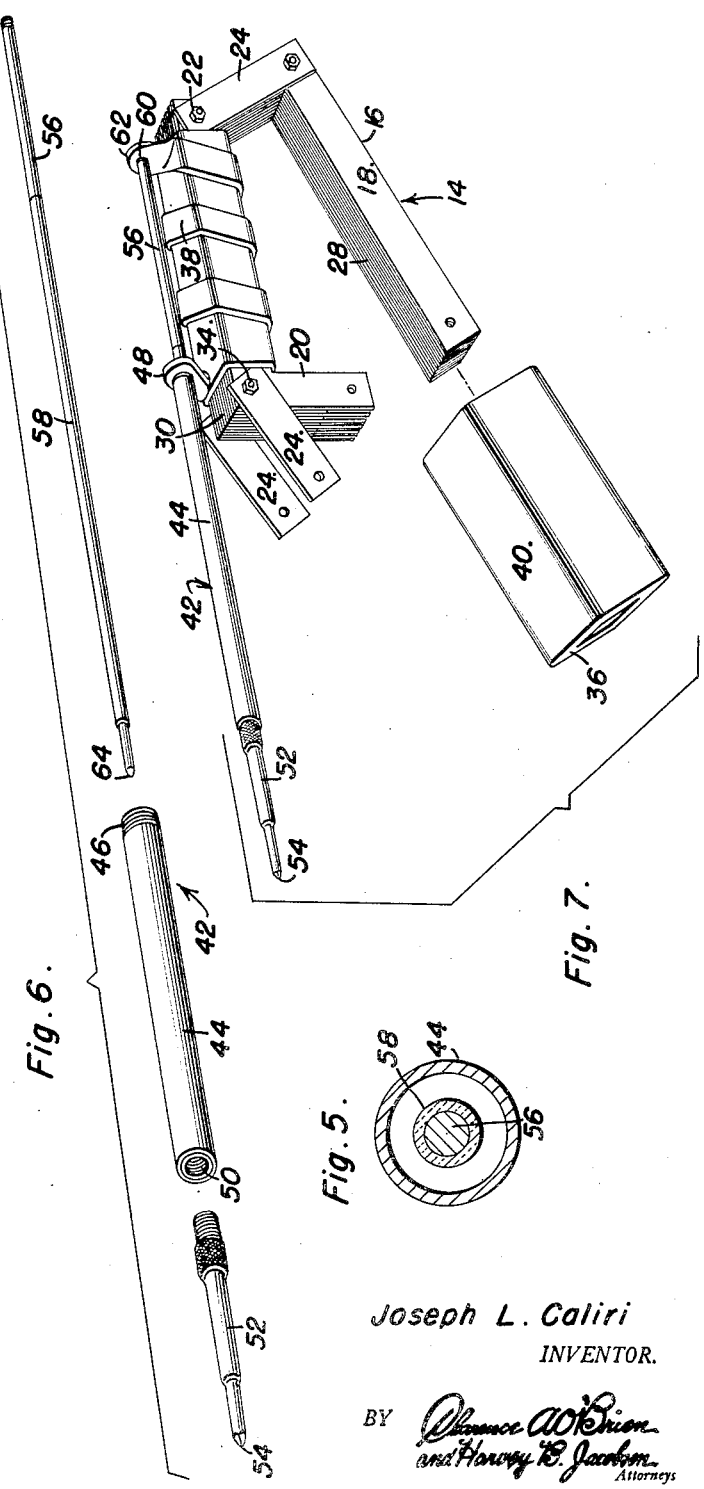
Joseph L. Caliri
INVENTOR.
BY Clarence A. O'Brien
and Harvey B. Jacobson
Attorneys Patented July 17, 1951

2,560,552

UNITED STATES PATENT OFFICE 2,560,552

SOLDERING GUN

Joseph L. Caliri, Orange, N. J., assignor, by mesne assignments, to Caliri Manufacturing Co., Inc., Lawrence, Mass., a corporation of Massachusetts Application June 29, 1949, Serial No. 102,113

2 Claims. (Cl. 219—26)

This invention relates to new and useful improvements and structural refinements in soldering guns, and in particular, the invention concerns itself with that type of soldering apparatus which includes a step-down transformer having its secondary winding in closed circuit with an electrode unit, a portion of the latter offering, as compared to its remaining portions, a relatively greater resistance to the passage of electric current, so that the portion of greater resistance becomes heated and, in turn, may be effectively employed for heating the work and melting solder by being brought in contact therewith.

The primary object of the invention is to provide a highly improved and very efficient apparatus of this nature, the principal feature of which resides in a novel construction of the electrode unit, while other features lie in the structure of the step-down transformer, this being so arranged that the substantial heat generated in the secondary winding thereof is not transmitted to the primary winding and, as a result, the latter is protected against undue overheating and deterioration.

Other features of the transformer structure reside in the arrangement of the transformer core, this being such that the primary and secondary windings may be selectively and independently replaced when an occasion to do so arises.

Some of the advantages of the invention lie in its simplicity of construction, in its efficient and economical operation, and in its adaptability to convenient manufacture.

With the above more important objects and features in view, and such other objects and features as may become apparent as this specification proceeds, the invention consists essentially of the arrangement and construction of parts as illustrated in the accompanying drawings, in which:

Figure 1 is a side elevational view of the invention, illustrating the soldering gun housing in dotted lines;

Figure 2 is a top plan view of the subject shown in Figure 1;

Figure 3 is a cross-sectional view, taken substantially in the plane of the line 3—3 in Figure 1;

Figure 4 is a fragmentary longitudinal section taken substantially on the plane of the line 4—4 in Figure 2;

Figure 5 is a cross-sectional detail, taken substantially on the plane of the line 5—5 in Figure 4;

Figure 6 is an exploded perspective view of the electrode unit per se; and

Figure 7 is a group perspective view of the electrode unit and transformer, the latter being shown partially disassembled.

Like characters of reference are employed to designate like parts in the specification and throughout the several views.

Referring now to the accompanying drawings in detail, the invention consists of a soldering gun designated generally by the reference character 10, the same embodying in its construction a suitable "pistol" type housing 12 of any conventional design, such as for example is disclosed in my Design Patent Number Des. 153,495, or Des. 153,496, which two patents were issued to me on April 26, 1949.

The housing 12 accommodates a step-down transformer assembly 14 including a substantially rectangular core 16 which consists of primary and secondary sets of L-shaped laminations 18, 20 respectively, the ends of the relatively long sides of the laminations in each set being connected as at 22 to the ends of the relatively short sides of the laminations in the other set, this connection simply assuming the form of removable pivot bolts, as will be clearly apparent. In addition, suitable side straps 24 may be provided in juxtaposed relation on the short arms of the laminations, these straps being attached to each set of laminations as at 26.

It is to be noted that the long sides of the two respective sets of laminations 18, 20 constitute mutually spaced primary and secondary core members 28, 30 respectively, and layers of insulating material 32, 34 respectively are provided on each of these core members, as is best shown in Figure 3. The primary winding 36 is wound around the insulation layer 32 on the core member 28, this winding, of course, consisting of relatively thin wire, as will be clearly understood. Similarly, secondary winding 38 is wound around the insulation layer 34 on the core member 30, this secondary winding being relatively heavy as compared to the primary winding and preferably consisting of a coiled strap, substantially as shown. External insulation on the secondary winding is not required, but it is to be noted that an external insulating layer 40 is provided on the primary winding 36.

It will be apparent from the foregoing that by simply loosening one of the screws 22 and removing the remaining screw 22, the primary and secondary set of laminations 18, 20 may be swung apart from their normal rectangular formation, this opening or disassembly of the laminations being illustrated in Figure 7. Thereupon, the primary winding 36 and the secondary winding 38 may be selectively and independently removed from their respective core members, depending on which of the two screws 22 was removed and which was permitted to remain. In any event, the above described structure of the transformer core facilitates independent replacement of the primary and secondary windings, and in addition, it is to be noted that the core members 28, 30 are mutually spaced and independent, so that the heat generated in the secondary winding is not transmitted by physical contact to the primary winding and the latter, in turn, is protected against undue overheating and deterioration.

The apparatus also embodies in its construction an electrode unit designated generally by the reference character 42, this consisting of a substantially tubular outer member 44 which has one end portion thereof screw-threaded as at 46 into a screw-threaded aperture provided in one end 48 of the secondary winding strip 38, as shown.

The screw-thread 46 is external, while the remaining end portion of the electrode member has pressed therein an internally screw threaded bushing 50 adapted to receive an externally screw threaded portion of a replaceable, substantially tubular work engaging head 52 which preferably has a pointed free end or tip 54.

A rod-shaped inner electrode member 56, provided with a sleeve 58 of insulating material, extends into the outer electrode member 44 but projects outwardly therefrom, its projecting end portion being externally screw-threaded as at 60, so that it may be secured in a screw-threaded aperture provided in the remaining end 62 of the secondary winding strip 38, as shown.

On the other hand, the inner end 64 of the inner electrode member 56 electrically contacts the interior surface of the tip 54 of the work engaging head 52 of the outer electrode member 42, whereby the two electrode members complete the circuit through the secondary winding 38 of the transformer.

It is to be noted that after the screw-threaded portion 46 of the outer electrode member 44 is adjusted in the end portion 48 of the secondary winding, and after the screw-threaded portion 60 of the inner electrode member 56 is similarly adjusted in the end portion 62 of the secondary winding, the end portions of the secondary winding strip are sufficiently resilient so as to urge the inner electrode member 56 in the direction of the arrow 64 (see Figure 4), thus causing the tip of 64 of the inner electrode member 56 to electrically contact the inner surface of the tip 54 of the outer electrode member 44, but since this electrical contact, from a physical standpoint, is only of a frictional nature, a region of high electrical resistance is presented at this point of contact, which results in the generation of substantial heat in the tip 54 of the outer electrode member, which generated heat, in turn, may be transmitted to the work by engaging the tip of the electrode unit therewith.

It will be observed that by virtue of the outer electrode member 44, the inner electrode member 56 is protectively enclosed within the outer member, and the resiliency of the end portions 48, 62 of the secondary winding strip 38, combined with the adjustment facilitated by the screw-threads 46, 60, provides a certain amount of variation in the physical as well as electrical contacts between the points 64, 54 of the two electrode members, thus varying the amount of generated heat accordingly.

If desired, the head 52 may be formed integrally with the outer electrode member 44, but the separate formation of the head as described facilitates convenient replacement thereof in instances where the tip portion 54 of the head becomes worn or otherwise damaged by repeated contact with the work.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. In a soldering gun, the combination of a coiled strap affording a path for the secondary circuit of a step-down transformer and having a pair of spaced parallel end portions provided with coaxial apertures, a tubular outer electrode member having one end portion thereof secured in the aperture of one end portion of said strap, an elongated and hollow head provided at the free end of said outer electrode member and having a closed work engaging end, a rod shaped inner electrode member secured at one end thereof in the aperture of the second end portion of said strap and extending axially in said outer member in spaced relation therefrom, the free end portion of said inner electrode member extending axially in said head and abutting the closed work-engaging end of the latter for electrical connection therewith, and a tubular insulating sleeve positioned on the inner electrode member to electrically isolate the same from the outer member and from all but the free end portion of said head.

2. The device as defined in claim 1 together with a screw-threaded bushing provided in the free end portion of said outer electrode member and having said head removably secured therein.

JOSEPH L. CALIRI.

REFERENCES CITED

The following references are of record in the file of this patent:

UNITED STATES PATENTS

| Number | Name | Date |
|---|---|---|
| 466,937 | Pfannkuche | Jan. 12, 1892 |
| 750,525 | Everest | Jan. 26, 1904 |
| 1,505,085 | Brigham | Aug. 19, 1924 |
| 2,106,439 | Schubert | Jan. 25, 1938 |
| 2,244,576 | Schneblen | June 3, 1941 |
| 2,397,348 | Haines et al. | Mar. 26, 1946 |
| 2,405,866 | Weller | Aug. 13, 1946 |
| 2,476,121 | Smith, Jr. | July 12, 1949 |

FOREIGN PATENTS

| Number | Country | Date |
|---|---|---|
| 389,309 | Germany | Feb. 7, 1924 |
| 838,748 | France | Mar. 14, 1939 |